United States Patent

Lidstone et al.

[11] Patent Number: 5,884,843
[45] Date of Patent: Mar. 23, 1999

[54] ENGINE NOISE SUPPRESSION EJECTOR NOZZLE

[75] Inventors: Gary L. Lidstone, Federal Way; Larry T. Clark, Enumclaw; Imre A. Szupkay, Othello; David L. Sandquist, Renton, all of Wash.

[73] Assignee: The Boeing Company, Seattle, Wash.

[21] Appl. No.: 743,105

[22] Filed: Nov. 4, 1996

[51] Int. Cl.⁶ .................................................. F02K 1/34
[52] U.S. Cl. ........................... 239/265.13; 239/265.17; 181/220
[58] Field of Search ............................. 60/262; 181/215, 181/220; 239/265.13, 265.17

[56] References Cited

U.S. PATENT DOCUMENTS

| | | |
|---|---|---|
| 2,803,944 | 8/1957 | Kroon . |
| 2,838,909 | 6/1958 | Meulien . |
| 2,938,335 | 5/1960 | Cook, Jr. . |
| 2,952,124 | 9/1960 | Pearson . |
| 2,997,845 | 8/1961 | Oulianoff . |
| 3,027,714 | 4/1962 | Parker . |
| 3,237,864 | 3/1966 | Taylor et al. . |
| 3,263,931 | 8/1966 | Bartek et al. . |
| 3,333,772 | 8/1967 | Bruner . |
| 3,346,193 | 10/1967 | Tmicki ............................. 60/262 |
| 3,352,494 | 11/1967 | Colville et al. . |
| 3,372,876 | 3/1968 | Colville et al. . |
| 3,409,228 | 11/1968 | Mehr . |
| 3,432,100 | 3/1969 | Hardy et al. . |
| 3,463,402 | 8/1969 | Langston, Jr. . |
| 3,524,588 | 8/1970 | Duval . |
| 3,550,721 | 12/1970 | Bruner . |
| 3,613,826 | 10/1971 | Cabassut . |
| 3,637,041 | 1/1972 | Hilbig . |
| 3,647,020 | 3/1972 | MacDonald . |
| 3,664,455 | 5/1972 | Duvvuri . |
| 3,695,387 | 10/1972 | Hilbig . |
| 3,710,890 | 1/1973 | True et al. . |
| 3,774,868 | 11/1973 | Goetz . |
| 3,829,020 | 8/1974 | Stearns . |
| 3,830,431 | 8/1974 | Schwartz ............................. 60/262 |
| 3,897,169 | 7/1975 | Fowler . |
| 3,910,375 | 10/1975 | Hache et al. . |
| 3,990,530 | 11/1976 | Helfrich et al. . |
| 4,064,692 | 12/1977 | Johnson et al. . |
| 4,074,859 | 2/1978 | Lowman, Jr. . |
| 4,095,417 | 6/1978 | Banthin . |
| 4,165,609 | 8/1979 | Rudolph . |
| 4,175,640 | 11/1979 | Birch et al. . |
| 4,215,536 | 8/1980 | Rudolph . |
| 4,422,524 | 12/1983 | Osborn . |
| 4,537,026 | 8/1985 | Nightingale . |

(List continued on next page.)

OTHER PUBLICATIONS

"The Jet Engine," chapters 6, 14, 15 and 19, Rolls–Royce plc, 1992.

Primary Examiner—Louis J. Casaregola
Attorney, Agent, or Firm—Christensen O'Connor Johnson & Kindness PLLC

[57] ABSTRACT

A moderately high bypass ratio turbofan engine nozzle (36) is provided including an outer structure (46) and one or more ejectors (38). The ejectors (38) include inner and outer doors (82), (80) for closing off an ejector passage (76) extending through the outer structure (46). The ejectors (38) are sized to entrain exterior air (40) at aspiration ratios of generally less than 60%. The exterior air (40) is mixed with engine exhaust (42), resulting in a lower combined airflow velocity which in turn reduces jet exhaust noise. Mixing components formed as turning vanes (108) are located in the ejector passage (76) for encouraging further mixing of the airflows (40), (42). In preferred embodiments, the nozzle (36) further includes a translatable centerbody (52), an aft flap assembly (112), and a control system (122) for controlling the movements of the nozzle components. A method of suppressing aircraft moderately high bypass ratio turbofan engine exhaust noise including entraining exterior air to engine exhaust at an aspiration ratio of less than about 60%.

16 Claims, 5 Drawing Sheets

U.S. PATENT DOCUMENTS

| | | |
|---|---|---|
| 4,690,329 | 9/1987 | Madden . |
| 4,819,876 | 4/1989 | Thayer . |
| 4,909,346 | 3/1990 | Torkelson .................................. 60/262 |
| 4,958,489 | 9/1990 | Simmons . |
| 5,044,553 | 9/1991 | Degress . |
| 5,044,559 | 9/1991 | Russell et al. . |
| 5,154,052 | 10/1992 | Giffin et al. . |
| 5,216,879 | 6/1993 | Zysmann ................................... 60/262 |
| 5,261,229 | 11/1993 | Ford et al. . |
| 5,291,672 | 3/1994 | Brown . |
| 5,343,697 | 9/1994 | Johnson et al. . |
| 5,351,480 | 10/1994 | Kretschmer . |

ENGINE NOISE SUPPRESSION EJECTOR NOZZLE

FIELD OF THE INVENTION

The present invention relates to aircraft jet engine nozzles, and more particularly, to nozzles for reducing engine noise in turbofan jet engines.

BACKGROUND OF THE INVENTION

Jet exhaust noise results from the turbulent mixing of exhaust gases with the atmosphere. The noise is influenced by the shearing action caused by the relative speed and temperature between the ambient and exhaust airflows. Jet exhaust noise may be reduced if the relative temperature and velocity is reduced. Exhaust noise can be especially troublesome for supersonic airplanes because current designs employ turbojets or low bypass ratio turbofans which require high velocity exhaust to produce the required thrust during takeoff.

Ejector nozzles are currently used extensively in pure jet and low bypass ratio engines as noise suppression devices. Generally, ambient air is introduced (i.e., aspirated) into a nozzle duct through auxiliary inlets, called ejectors. The ambient air is mixed with the hot engine exhaust, thereby reducing the overall velocity and temperature of the engine exhaust before it exits the nozzle. Mixing components are occasionally used in conjunction with the ejectors in the pure jet and low bypass ratio applications in order to more thoroughly mix ambient air with exhaust gas.

Turbojet and low bypass ratio engines require high aspiration levels (i.e., generally greater than about 60% of the engine exhaust) in order to provide adequate levels of noise suppression. High aspiration levels require the ability to significantly vary nozzle geometry. This requires ejectors capable of assuming a wide range of positions. In addition, the ejectors and mixing components must be capable of being selectively removed from the nozzle duct airflow path in order to transition the nozzle to an acceptable performance configuration when noise suppression is not required. The combination of these requirements often results in nozzle designs that are heavy, complex, and have low performance characteristics.

In contrast to the pure jet and low bypass ratio engines, moderately high bypass ratio engines (i.e., generally in the range of 0.6 to 1.0) usually create less jet exhaust noise to begin with due to their ability to produce thrust with lower average exhaust velocities. Noise reduction for moderately high bypass ratio engines generally consists of using a common or integrated exhaust nozzle that partially mixes the bypass and primary exhaust gases prior to their ejection into the atmosphere.

It is known to use ejector nozzles to improve nozzle performance in specific flight conditions. In particular, adding ambient air around the periphery of the exhaust gases of a bypass engine reduces aerodynamic boattail drag at transonic conditions. This is done during transonic and supersonic flight conditions where noise suppression is of no concern. For low bypass ratio applications, it is also known to use ejector nozzles to reduce noise. This is not the case for moderately high bypass ratio applications. Where the aerodynamic performance benefit is not sought, such as during takeoff and landing approach, ambient air is not added in a moderately high bypass ratio engine. Ejectors (for mixing ambient with engine exhaust) have not been used in moderately high bypass ratio turbofan engines for noise reduction for various reasons, including the generally held belief that the benefits of such use would be too small to justify the weight, space, and system complexity expenses associated with adding low bypass ratio ambient air noise suppression ejectors to moderately high bypass ratio jet engines.

In contrast to this belief, the inventors have recently discovered, however, that an optimum noise suppression solution for some aircraft is to aspirate a relatively small amount of ambient air into the engine exhaust of moderately high bypass ratio turbofan engines powering the aircraft. This has resulted in a need for such a nozzle. The ideal nozzle should not significantly add weight, space, or complexity to the overall engine system. Further, the ideal nozzle should include mixing components to further increase the mixing of ambient air with exhaust gas in a way that does not adversely affect the engine's performance.

SUMMARY OF THE INVENTION

In accordance with the present invention, a noise suppression nozzle for use with a moderately high bypass ratio engine is provided. The noise suppression nozzle is a termed a low aspiration ejector nozzle. In a preferred embodiment, the nozzle includes an outer structure within which a centerbody is longitudinally located. The exhaust nozzle may be either a two-dimensional or axisymmetric nozzle. The area between the centerbody and the outer structure generally defines a convergent-divergent exhaust duct. An ejector extends through the outer structure at a location near the duct throat. Mixing components may be provided to further enhance mixing of engine exhaust and exterior air. Both the ejector and the mixing components are located near the throat or near the divergent region of the exhaust duct.

In accordance with further aspects of this invention, one embodiment of the centerbody includes a plug and lead ball assembly located axially within the plug for translating the plug in a fore and aft direction.

In accordance with other aspects of this invention, one embodiment of the ejector includes an inlet passage extending through the outer structure. The passage is oriented at an inward angle between about 20 to 45 degrees in going in the fore-to-aft direction. Inner and outer doors are provided for closing off the passage to the exterior atmosphere and the exhaust duct, respectively. The ejector includes an open position and a close position. The open position allows entrainment of exterior air into the exhaust duct in amounts of about 50% or less, depending on the particular engine point design.

In accordance with still further aspects of this invention, preferred mixing components include a plurality of stationary turning vanes located within the ejector inlet passage. The turning vanes are positioned within the passage in a fore-to-aft direction to impart an angle of about 20 to 50 degrees to the entering exterior air. The turning vanes thereby impart a tangential directional component (i.e., swirl) to the entering exterior air. The plurality of turning vanes preferably includes about 24 to 84 turning vanes.

In accordance with still other aspects of this invention, the ejector nozzle further includes a control system having at least one input indicative of current flight conditions. The control system is in communication with the ejectors to cause the ejectors to assume their open position during takeoff and/or landing approach.

In accordance with yet other aspects of this invention, a method of suppressing aircraft moderately high bypass ratio turbofan engine exhaust noise is provided. The method includes providing an engine of moderately high bypass ratio of preferably between about 0.6 to 1.0, and entraining exterior air to engine exhaust at an aspiration ratio of preferably less than about 60%. The method may additionally include the step of mixing the entrained exterior air and the engine exhaust in the exhaust duct. A preferred embodiment of the method of mixing includes using the turning vanes.

In accordance with yet further aspects of this invention, the exterior air is ambient air and the engine exhaust is a combination of primary exhaust and bypass airflow.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to providing an apparatus and method for suppressing exhaust noise in moderately high bypass ratio turbofan jet engines (i.e., bypass ratios of roughly 0.6 to 1.0 depending on the engine). As used herein, the term "exterior air" generally refers to ambient air. Exterior air may, however, refer to bypass air or to a mixture of bypass and ambient, depending on the application. The term "engine exhaust" generally refers to a combination of primary and bypass air. Likewise, engine exhaust may refer to pure primary exhaust, depending on the application. The term "nozzle exhaust" refers to the combination of the exterior air and engine exhaust. A nozzle formed in accordance with the present invention is described below as applied to an axisymmetric nozzle. With appropriate changes, the present invention, however, may be designed for use with a two-dimensional nozzle.

Figure 1:
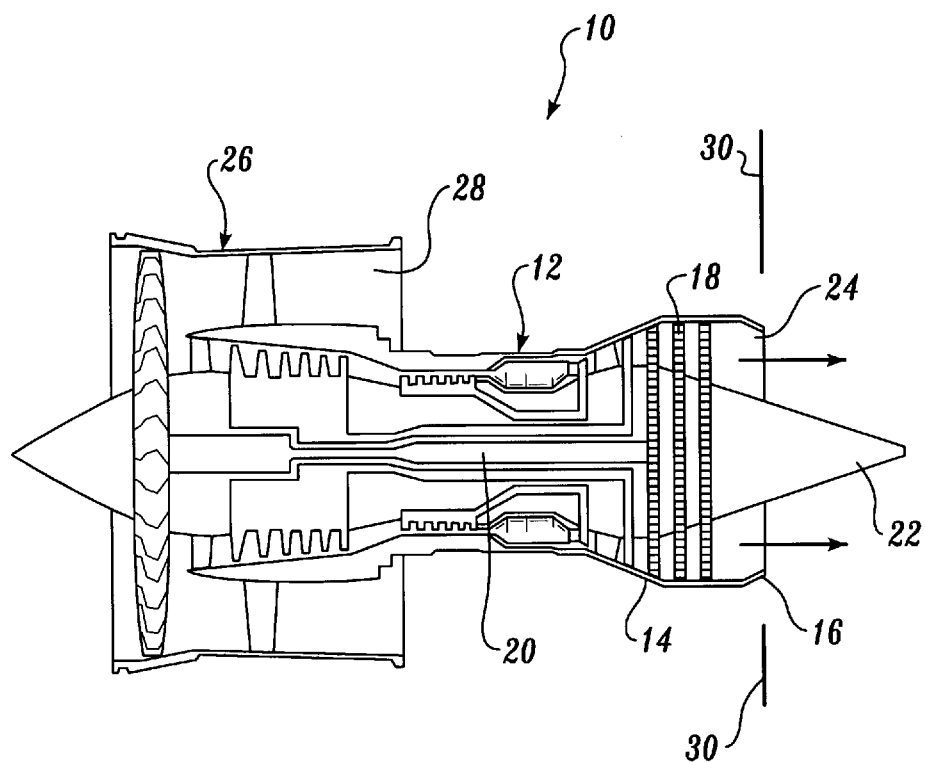
FIG. 1 is a side view of a prior art high bypass ratio turbofan engine.

FIG. 1 is provided for general orientation to turbofan engines. Referring to FIG. 1, high bypass ratio turbofan engines 10 include a gas generator 12 enclosed in a casing 14 to which an end annulus 16 is attached. A series of turbines 18 are located near the aft end of the generator and are mounted to a turbine shaft 20. In some turbofan engine designs, a tail cone 22 extends aftward through the interior of the annulus to form a short primary duct 24 between the annulus and the cone. The turbines expel primary exhaust rearward out the primary duct. A large single or multi-stage fan 26 supplies a secondary or by-pass airstream that flows through a fan duct 28 circumscribing a forward portion of the gas generator. The fan is co-axially mounted to the turbine shaft. To reduce exhaust noise for high and moderately high bypass ratio engines, a common exhaust nozzle (not shown) may extend aftward from the fan to form a duct region in which the secondary and primary airflows merge prior to being expelled jointly into the atmosphere. The subsonic mixing of these airflows occurs just aft of the annulus, at a confluence plane 30.

Figure 2:
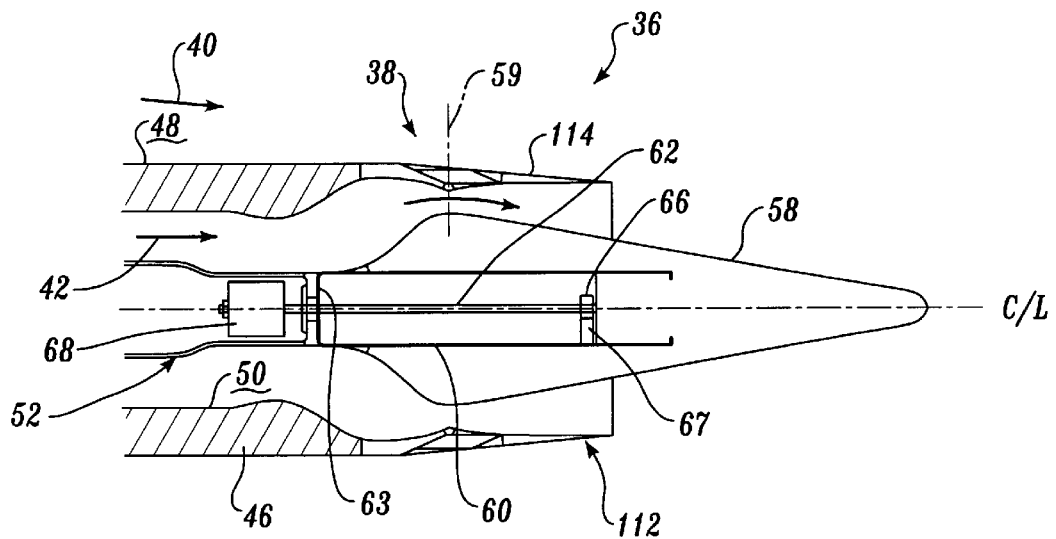
FIG. 2 is a side view of a moderately high bypass ratio engine noise suppression nozzle formed in accordance with the present invention, configured for non-noise suppression.

FIG. 2 is a side view illustration of one embodiment of an axisymmetric noise suppression exhaust nozzle 36 formed in accordance with the present invention for use with a moderately high bypass ratio turbofan engine. In general, the nozzle 36 includes a number of ejectors 38 placed equal distances about the circumference of the nozzle. The ejectors 38 are sized to entrain an annulus of exterior air 40 at aspiration ratios of generally less than 60% (depending on flight and engine conditions). The exterior air 40 is mixed with the engine exhaust 42, resulting in a lower combined airflow velocity which in turn reduces jet exhaust noise. During the cruise portion of a flight, the nozzle 36 may utilize the ejectors 38 to maximize flight performance by reducing aft body drag. Preferably, mixing components (one embodiment shown in FIG. 4) are included with the ejectors 38.

In more detail, the nozzle 36 includes an outer structure 46 attached to the aft end of the gas generator. As is known in the general art of nozzle design, the outer structure 46 includes numerous support beams and struts (not shown) positioned longitudinally and circumferentially (or laterally) at various locations throughout the nozzle 36. The support beams and struts support the weight of the nozzle components and react to nozzle pressure and maneuver loads during flight. The present invention uses such support beams and struts to carry the ejectors 38 and mixing components as well. Outer skins attached to the outboard regions of the support beams and struts form the nozzle exterior surface 48. Inner skins attached to the inboard regions of the support beams and strut form nozzle interior surfaces or nozzle sidewalls 50. The support beams and struts and the skins are provided and appropriately modified to accommodate the features of the present invention as described herein.

Figure 3:
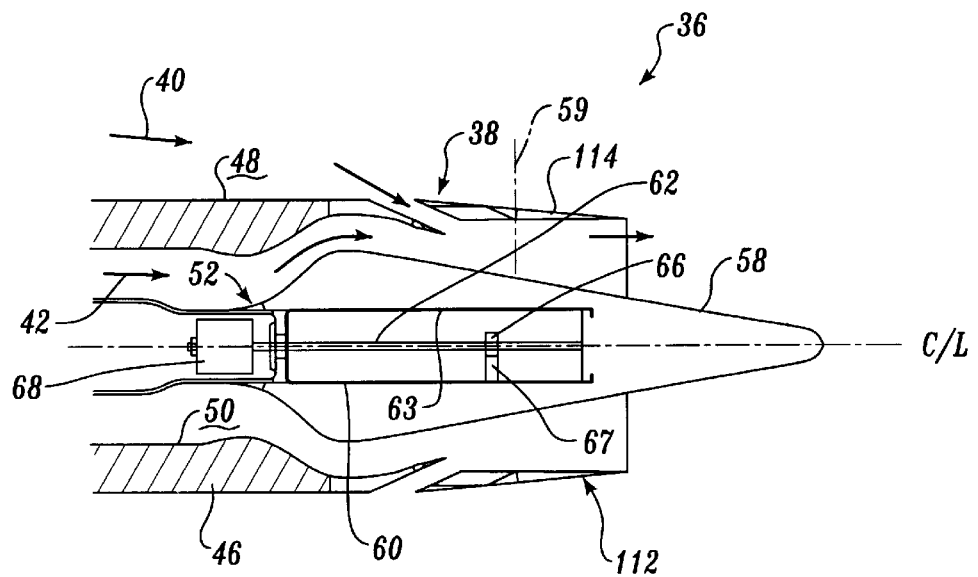
FIG. 3 is a side view of the nozzle of FIG. 2, configured for noise suppression.
Figure 4:
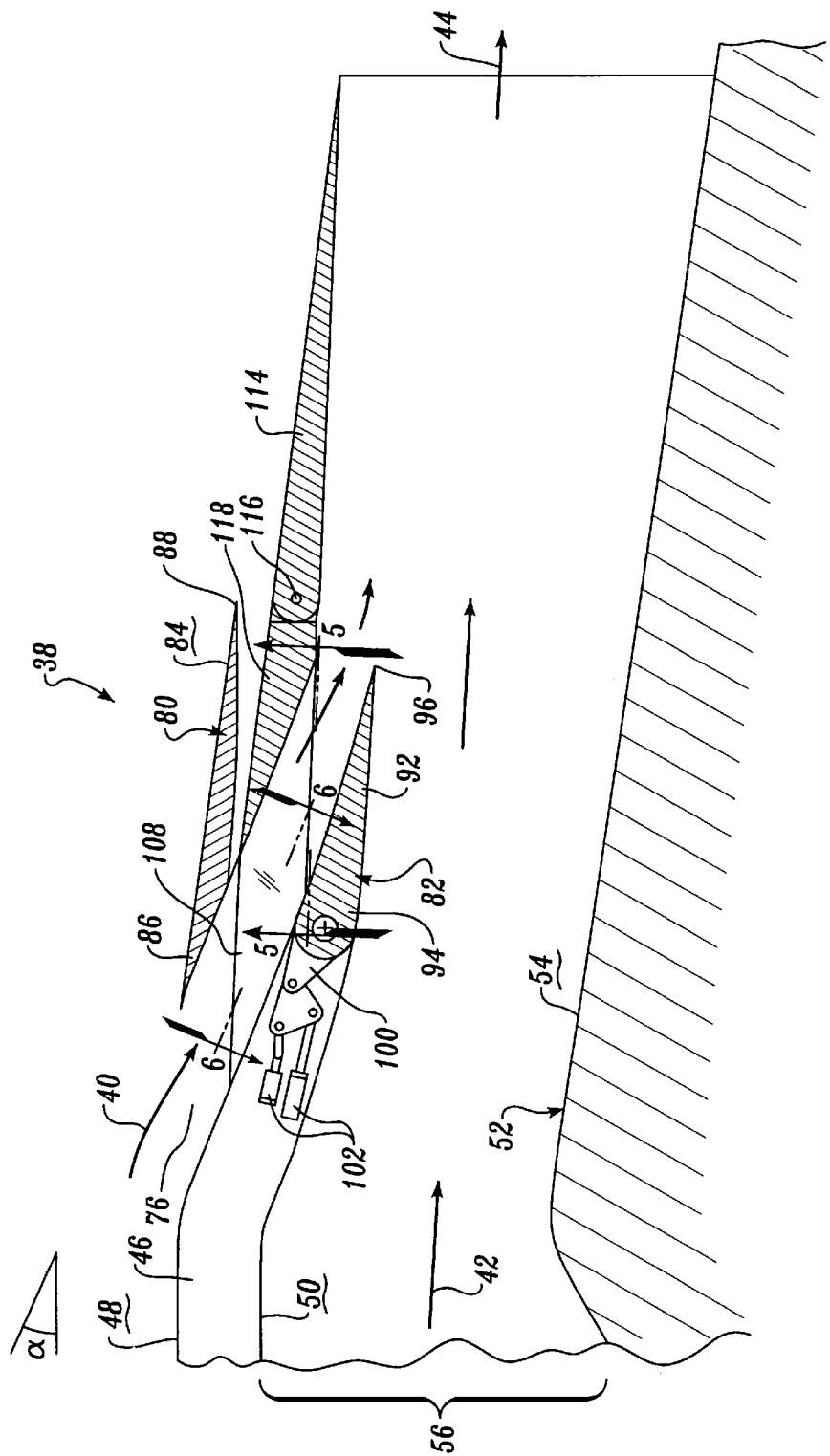
FIG. 4 is a detail side view of an ejector formed in accordance with the present invention in an open position.

Shown in FIGS. 2–4, a centerbody 52 is located along the nozzle longitudinal centerline and extends past the outer structure aft end. The area between the centerbody exterior surface 54 and the nozzle sidewalls 50 defines an exhaust duct 56. See FIG. 4. The centerbody 52 is shaped so as to alter the exhaust duct 56 contour in order to influence engine thrust and performance characteristics. Since centerbodies are known in the art of nozzle design they are described here only in general terms. The centerbody 52 may be a stationary or movable exhaust tail cone, plug assembly, or other component positioned longitudinally in the nozzle duct 56. In FIGS. 2 and 3, the centerbody 52 includes a translatable plug 58 attached to an exhaust tail cone. The plug 58 is shaped to ensure a convergent-divergent nozzle exhaust duct shape. Fore and aft translation of the plug 58 varies the size and location of the duct throat 59. The duct throat 59 is defined as the region where the nozzle exhaust duct changes from divergent to convergent. Changing the location of the duct throat 59 allows the nozzle 36 to be precisely matched to an engine as engine settings and conditions change. As is seen by comparing FIGS. 2 and 3, the throat 59 may be made to move longitudinally and to change in cross-sectional area depending on the plug's position relative to the sidewalls 50.

Longitudinal centerbody translation may be accomplished using any one of a number of methods. One example of a translatable arrangement is shown in FIGS. 2 and 3. The nozzle tail cone includes a concentric cylinder 63 that extends aftward into the plug 58, ending at approximately the end of the nozzle. A power screw 62 is located within the concentric cylinder and is oriented along the nozzle longitudinal center line. More specifically, the power screw is rotatably mounted in both ends of the cylinder 63. A collar 66 is threaded onto the power screw 62. The collar 66 includes an arm 67 that extends through a longitudinal slot (not shown) in the concentric cylinder 63. The outer end of the arm 67 is affixed to a cylindrical sleeve 60 that is attached to the interior of the plug 58. The power screw forward end is rotated by a motor 68 located in the nozzle tail cone near the adjacent end of the cylinder 63. During use, the motor 68 rotates the screw 62 which in turn, moves the collar 66 longitudinally fore and aft. Because the collar 66 is connected by the arm 67 to the sleeve 60 which forms part of the plug 58, rotation of the screw 62 causes the plug 58 to move fore and aft. The slot, plus additional axial guides or struts (not shown), ensure that the plug 58 does not rotate. Depending on the precise application, cooling mechanisms may be used to cool portions of the centerbody 52. Bleed air from either the installation fan or compressor are potential cooling sources.

As will be recognized by those skilled in the art, there exists a number of alternative translation arrangements. For example, a motor may be positioned in the outer structure and connected to the plug through bevel gearing and a radial plug support strut. Such an arrangement potentially eliminates the centerbody cooling requirement. Or, instead of a motor, a linear hydraulic actuator could be used to translate the plug fore and aft.

FIG. 4 is an enlarged side view of a preferred embodiment of an ejector 38. The ejector includes an exterior air inlet passage 76 extending through the nozzle outer structure 46. The passage is preferably angled inward in going fore-to-aft at angles a of between 20 to 45 degrees. Formed in the outer structure 46 near the nozzle exterior surface 48 are one or more outer doors 80 for closing off the passage 76 to the exterior atmosphere. One or more inner doors 82 are provided for closing off the passage 76 at the exhaust duct 56. As described below, actuation components move the outer and inner doors 80, 82, and hence the ejectors 38, between open and closed positions. In a closed position, the inner and outer doors 82, 80 are positioned to prohibit airflow through the passage 76. In the embodiment of FIG. 4, the outer doors 80 are opened by translating aft and the inner doors 82 are opened by rotating away from the passage 76. The open door positions allow entrainment of exterior air 40 into the nozzle 36 via the inlet passage 76. It is preferred to located the ejectors 38 such that the exterior air 40 enters at or just downstream of the throat 59, where the exhaust duct 56 begins to diverge.

There are preferably between about 1 to 20 outer doors 80 spaced evenly about the nozzle circumference. In a two-dimensional nozzle, one or more outer doors can be placed laterally between upright sidewalls. Preferably, the outer doors 80 are roughly equal in size. Referring still to FIG. 4, each outer door 80 includes an exterior surface 84, a forward end 86, and an aft end 88. The forward end 86 first diverges in the aft direction and, the tapers to a point at the aft end 88. This shape is preferred because it helps seal the area between the exterior atmosphere and the ejector passage 76 when the outer doors 80 are closed.

The outer doors 80 may be formed (cut, molded, pressed, etc.) from a solid piece of material (e.g., nickel-based super alloy, titanium, aluminum, ceramic, etc.) or may be built-up from various submembers, such as a composite or a sandwich-type structure. The thickness of the outer door 80 will depend on the amount of space available in the passage 76 for housing the outer door 80 in its closed position, as well as the aerodynamic forces anticipated during use. In general, the outer door 80 should be strong enough to prohibit exterior air 40 from pushing past the outer door 80 and into the passage 76.

In the closed position (i.e., non-suppressed noise mode) of FIG. 2, the outer door exterior surfaces 84 are flush with the surrounding outer structure exterior surfaces 48. This reduces the aerodynamic drag caused by the exterior airflow 40 passing over the outside of the nozzle. In the open position (i.e., suppressed noise mode) of FIG. 3, the outer doors 80 are moved away from the duct 56 to allow exterior air 40 to enter the ejector passage 76. The outer doors 80 are translated between opened and closed positions using any one of a number of known actuation mechanisms. For example, a ball-screw assembly powered by a rotation mechanism, e.g., rotary actuators, motors, etc., can be used. Alternatively, a translating linear actuators located within the outer structure 46, etc. can be used. Regardless of the actuation mechanism selected, preferably, the actuation mechanism is controlled by a computer control system, as described below.

The inner doors 82 provide access between the ejector passage 76 and the exhaust duct 56. In an axisymmetric nozzle, the preferred inner doors is an annular iris-type door, i.e., a door in which individual flaps 92 are hinged about their forward ends 94 to the outer structure 46 that defines the nozzle sidewall 50. The aft ends 96 of the individual flaps 92 are aerodynamically tapered. This configuration is preferred since it provides aerodynamic contours for both the engine exhaust 42 along the exhaust duct 56 and entrained air 40 along the ejector passage 76. The shape of the inside of the inner doors 82 corresponds generally to the shape of the section of the duct inlet requiring covering, i.e., the inner end of the ejector. The length of the inner doors will depend on the width of the ejector passage 76. The thickness of the inner doors will depend on the anticipated loads and inner door method of construction. The inner doors 82 are preferably formed from a sheet of molded or bent heat and corrosion resistant skin, e.g., a nickel-based super alloys, attached to a number of interconnecting structural members.

The inner doors expose the ejector passage 76 during suppressed noise flight modes, by rotating the individual flaps 92 away from the passage 76. In the open position (i.e., the noise suppression mode), the inner doors 82 control the location and size of the exhaust duct's throat 59, which is located at or near the door aft ends 96. The level aspiration for the nozzle is also partially controlled by the position of the inner doors 80, along with engine setting, flight velocity, mixing area, etc.

In the closed position, the inner door inboard surfaces are flush with the surrounding exhaust duct sidewalls 50. The actuation components move the inner doors 82 between their open and closed positions. As with the outer doors 80, there are a number of actuation systems that can be used with the inner doors. A preferred system is shown in FIG. 4 and includes a lever arm 100 connected to the forward end 94 of each individual flap 92, such that the door axis of rotation lies between the lever arm and the flap 92. One or more actuators 102 are linked to the arm to cause it, and hence the flap 92, to rotate about the axis.

Other inner and outer doors 82, 80 and actuation configurations may be used, as appropriate for a particular application. In addition, instead of independent actuation, the inner and outer doors 82, 80 be made to move using the same mechanisms. For two-dimensional nozzle applications, the ejectors are divided into sets of upper and lower ejectors. Therefore, the preferred embodiment of inner and outer doors 82, 80 for two-dimensional nozzles is actually two pairs of inner and outer doors, one pair for the upper nozzle region and one pair for the lower nozzle region.

According to the understanding of the inventors, larger reductions in noise may be obtained by fully mixing the exterior air 40 and engine exhaust 42 prior to its discharge from the nozzle 36. Therefore, it is desirable to extend the nozzle 36 as far as possible to provide sufficient nozzle duct area within which the two airflows can mix. For some turbofan engines, however, a shorter nozzle length is optimum for performance. In those cases, it may be desirable to include mixing components in the nozzle to encourage mixing of the entrained exterior air 40 with the engine exhaust 42.

Figure 5:
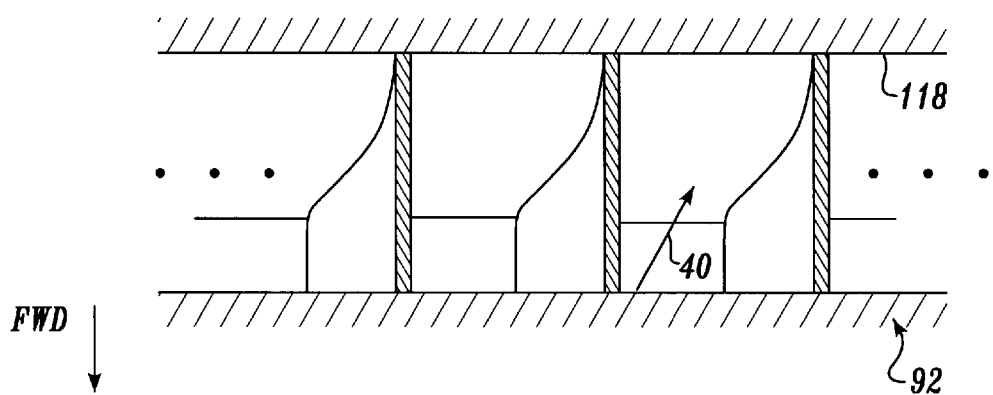
FIG. 5 is a circumferential view along lines 5—5 of FIG. 4.
Figure 6:
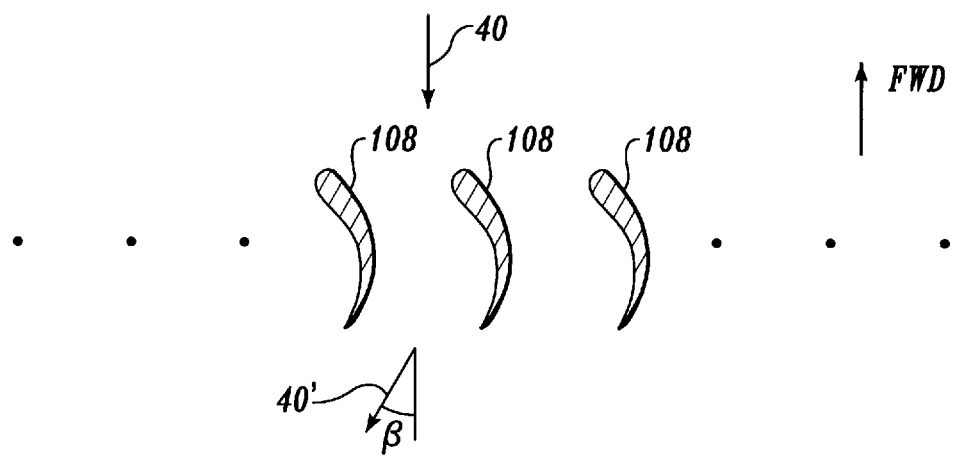
FIG. 6 is a circumferential view along lines 6—6 of FIG. 4.

Referring to FIGS. 4 and 5, mixing components, such as a plurality of stationary turning vanes 108 are located in the ejector passage 76. The plurality of turning vanes 108 preferably includes 24 to 84 stationary turning vanes spaced equaldistances apart. The turning vanes 108 are slightly bowed in their axial direction (similar in shape to an airfoil). It is preferable that the vanes 108 be positioned in the inlet passage 76 so that the exterior air 40 is turned an angle β of about 20 to 50 degrees. The turned exterior air is labeled in FIG. 6 as item 40'. The turning vanes 108 thereby impart a tangential directional component to the entering exterior air 40.

The turning vanes 108 are formed of a rigid materials, e.g., nickel based superalloys, titanium, etc. The vanes 108 may be solid or they may be built-up from different materials or components. Although other types of mixing components may be used, the turning vanes 108 advantageously require no moving parts, take little space, and provide an appreciable source of mixing. Additionally, the turning vanes are not exposed to exhaust flow 42 or exterior flow 40 during the non-suppressed mode. These benefits are significant enough to permit the turning vanes 108 to be used on low bypass ratio engines as well as high and moderately high bypass ratio engines.

Downstream of the ejectors 38, the outer structure 46 continues in a roughly linear manner as shown best in FIGS. 2 and 3. Preferably, an aft flap assembly 112 is formed in the outer structure 46 at the end of the divergent region of the nozzle exhaust duct 56. The aft flap assembly 112 may be used for tailoring the shape of the divergent portion and providing correct engine matching. The preferred flap assembly is similar to known flap arrangements, except the assembly of the present invention should be lengthened to approximately 100 inches. This allows for the most efficient expansion of the engine exhaust 42 in the non-suppressed mode and mixing of the engine exhaust and the entrained airflow 40 in the suppressed mode.

In more detail, the flap assembly 112 includes a plurality of rotatable and/or translatable aft flaps 114. A series of about eight to twenty flaps and seals are positioned circumferentially about the nozzle. (For two-dimensional nozzles, the flaps are split between upper and lower flap arrangements.) The aft flaps 114 should be formed of rigid, temperature and corrosion resistant materials. It is recommended that the aft flaps 114 include a plurality of acoustic liners (not shown) formed along the aft flap inboard surfaces. Acoustic linings help to attenuate jet exhaust noise including any noise caused by the engine exhaust 42 mixing with the entrained exterior air 40.

Referring to FIG. 4, the forward ends of the aft flaps 114 are rotatable about an axis of rotation 116 positioned at a closeout member 118 located in the outer structure 46 between the ejectors 38 and the aft flaps 114. The aft flaps 114 rotate between outboard and inboard positions via operation of a flap actuation system (not shown). The actuation system may be formed using any of a number of conventional techniques. One actuation assembly embodiment utilizes the known technique of a system of linear actuators translating a synchronizing ring which then drives the flaps. For two-dimensional nozzles, rotating disks may be used as well as linear or rotary actuators connected directly to the aft flaps. Alternatively, aft flaps capable of fore and aft translation may be used where appropriate.

Figure 7:
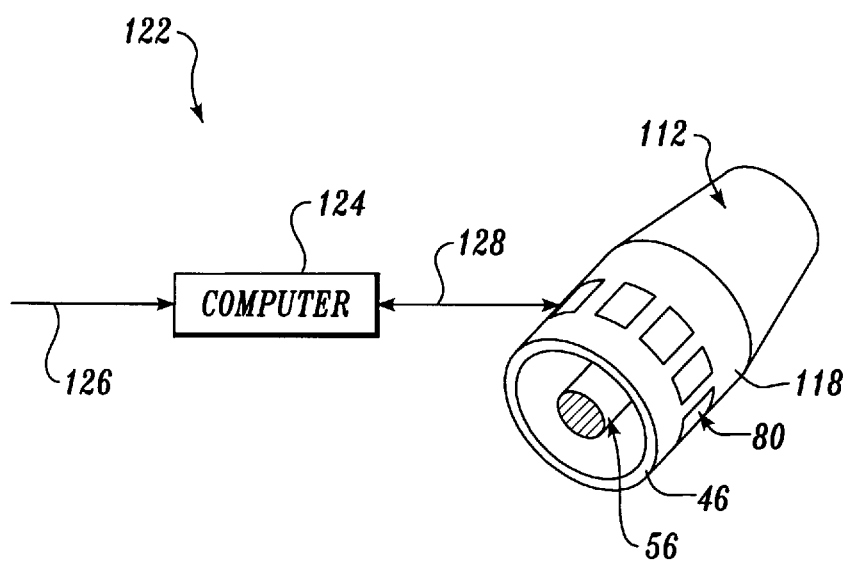
FIG. 7 is a diagram of a control system formed in accordance with the present invention.

Referring to FIG. 7, a control system 122 is provided to direct the ejectors 38 and the mixing components. The control system 122, which may be part of a flight management computer, or a separate, stand alone system, includes a digital computer 124 having a central processing unit, a primary memory, I/O units, and various interconnecting data buses. Input signals 126 representative of flight conditions are provided to the control system 122 from other aircraft system sources. The input signals 126 include data that denotes at least the takeoff and initial ascent of the aircraft, since these are the portions of flight in which noise suppression is most needed. It may also denote the approach and landing state of the aircraft if noise suppression is also needed during these portions of flight.

The control system supplies electronic control signals 128 to the actuation assemblies that operate the inner and outer doors of the ejectors 38. Upon receipt of an input signal 126 indicating a flight portion within which noise suppression is needed, the control system 122 commands the inner and outer doors 82, 80 of the ejectors 38 to open. In a preferred embodiment, the control system 122 causes the inner and outer doors 82, 80 of the ejectors 38 to open prior to takeoff and to remain open until at least 5 minutes after takeoff. If required, the control system 122 causes the doors to open at least 5 minutes prior to landing and to remain open until the plane has slowed significantly (e.g., the engines have been cut back or placed into a reverse thrust mode).

During noise suppression, when the ejector inner and outer doors 82, 80 are opened, the centerbody 52 is moved forward. This configuration is shown in FIG. 3. Since the static pressure inside the nozzle is less than the static pressure outside the nozzle, there is a natural tendency for exterior air to be entrained through the ejector passage 76 and into the nozzle exhaust duct 56. Using the control system, the ejector doors are positioned so that the appropriate level of aspiration occurs, given the flight and engine conditions. Where movable mixing components are used, they are likewise positioned to promote the appropriate level of mixing.

For moderately high bypass ratio turbofan engine applications in which the exterior air 40 is ambient air and the exhaust airflow is a combination of primary exhaust and bypass air, a preferred amount of ambient air entrainment is between about 20% to 50% of the combined exhaust. Higher amounts of aspiration are preferred for turning vanes 108 applied to pure jet or low bypass ratio engines.

When noise suppression is not needed, such as during subsonic and transonic cruise flight, the ejector doors 82, 80 are closed and the centerbody 52 is moved aft so that the duct throat 59 is positioned at the plug crown.

As will be readily appreciated from the foregoing description, the present invention nozzle has many advantages. In particular, the small size of the ejectors and mixing components require only a minimum of actuation components and nozzle space. The ejectors therefore have a low impact on the nozzle performance characteristics during transonic and supersonic flight while still providing desirable levels of noise suppression during takeoff and initial ascent. Additionally, the nozzle has a much smaller adverse weight impact on the aircraft since a low aspiration requires only a small range of available ejector positions.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. An exhaust nozzle for suppressing engine noise of a moderately high bypass ratio aircraft turbofan engine, the nozzle comprising:

(a) nozzle sidewalls and a centerbody located within the nozzle sidewalls, the area between the centerbody and the nozzle sidewalls defining an exhaust duct for passage of engine exhaust that includes both primary exhaust and bypass airflow;

(b) an ejector having an open position and a close position, the open position allowing the entrainment of exterior air into the exhaust duct in amounts equal to or less than about 60% of the engine exhaust; and (c) a control system having at least one input indicative of current flight conditions, the control system being in communication with the ejectors to cause the ejector to assume its open position during at least one of takeoff and landing approach conditions.

2. The exhaust nozzle according to claim 1, wherein the centerbody is a translatable centerbody including a plug and an assembly located axially within the plug for translating the plug in a fore and aft direction.

3. The exhaust nozzle according to claim 1, wherein the nozzle is a circular nozzle and the ejector is an annular ejector having portions extending through the sidewalls circumferentially about the nozzle.

4. The exhaust nozzle according to claim 3, wherein the ejector includes an exterior air inlet passage extending through the sidewalls and outer and inner doors for closing off the passage to the exterior atmosphere and the exhaust duct, respectively.

5. The exhaust nozzle according to claim 1, wherein the exterior air is entrained in an amount in the range of about 20% to about 50% of the engine exhaust.

6. The exhaust nozzle according to claim 1, further comprising mixing components associated with the ejector for encouraging mixing of the entrained exterior air with the engine exhaust.

7. An exhaust nozzle for suppressing engine noise of a moderately high bypass ratio aircraft turbofan engine, the nozzle comprising:

(a) nozzle sidewalls and a centerbody located within the nozzle sidewalls, the area between the centerbody and the nozzle sidewalls defining an exhaust duct for passage of engine exhaust that includes both primary exhaust and bypass airflow;

(b) an ejector having an open position and a close position, the open position allowing the entrainment of exterior air into the exhaust duct in amounts of mass equal to or less than about 60% of the mass the engine exhaust; and (c) a control system having at least one input indicative of current flight conditions, the control system being in communication with the ejectors to cause the elector to assume its open position during at least one of takeoff and landing approach conditions; and (d) mixing components associated with the elector for encouraging mixing of the entrained exterior air with the engine exhaust;

wherein the ejector includes an exterior air inlet passage and the mixing components comprise a plurality of turning vanes located within the ejector passage.

8. The aircraft exhaust nozzle according to claim 7, wherein the plurality of turning vanes are positioned within the passage in a fore-to-aft direction to impart an angle of about 20 to 50 degrees of swirl to the entering exterior air, the turning vanes thereby imparting a tangential directional component to the entering exterior air.

9. An aircraft engine exhaust nozzle for suppressing engine noise, the nozzle comprising:

(a) an outer structure having a nozzle exhaust duct therein for passing nozzle exhaust;

(b) an ejector having a passage extending through the outer structure, the ejector having an open position for allowing the entrainment of exterior air into the nozzle exhaust; and (c) mixing components for encouraging mixing of the entrained exterior air with the nozzle exhaust, the mixing components comprising a plurality of turning vanes positioned within the ejector passage.

10. The exhaust nozzle according to claim 9, wherein the nozzle is a circular nozzle and the ejector is an annular ejector.

11. The aircraft exhaust nozzle according to claim 9, wherein the plurality of turning vanes are positioned within the passage in a fore-to-aft direction to impart an angle of about 20 to 50 degrees of swirl to the entering exterior air, the turning vanes thereby imparting a tangential directional component to the entering exterior air.

12. The exhaust nozzle according to claim 9, wherein the passage is oriented at an inward angle between about 20 to 45 degrees in going in the fore-to-aft direction.

13. The exhaust nozzle according to claim 9, wherein the passage and the mixing components are located in a divergent region of the exhaust duct.

14. The exhaust nozzle according to claim 9, wherein the turning vanes are stationary.

15. The exhaust nozzle according to claim 9, wherein the plurality of turning vanes includes 24 to 84 turning vanes.

16. The exhaust nozzle according to claim 9, further comprising a control system having at least one input indicative of current flight conditions, the control system being in communication with the ejectors to cause the ejectors to assume their open position during at least one of takeoff and landing approach.

* * * * *